(12) United States Patent
Choi et al.

(10) Patent No.: US 11,296,371 B2
(45) Date of Patent: Apr. 5, 2022

(54) CELL-TAB-COOLING TYPE BATTERY

(71) Applicants: Hyundai Motor Company, Seoul (KR); Kia Motors Corporation, Seoul (KR)

(72) Inventors: Jun Seok Choi, Hwaseong-si (KR); Byung Su Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 16/690,631

(22) Filed: Nov. 21, 2019

(65) Prior Publication Data

US 2020/0343608 A1 Oct. 29, 2020

(30) Foreign Application Priority Data

Apr. 26, 2019 (KR) .................. 10-2019-0049330

(51) Int. Cl.
*H01M 10/38* (2006.01)
*H01M 10/6567* (2014.01)
*H01M 10/6569* (2014.01)

(52) U.S. Cl.
CPC ... *H01M 10/6567* (2015.04); *H01M 10/6569* (2015.04)

(58) Field of Classification Search
CPC ......... H01M 10/6567; H01M 10/6569; H01M 10/6561; H01M 10/6568; H01M 10/656; H01M 10/655; H01M 10/653
See application file for complete search history.

(56) References Cited

U.S. PATENT DOCUMENTS

2015/0188203 A1* 7/2015 Enomoto ............ H01M 50/543 429/83
2018/0123159 A1* 5/2018 Kim ...................... H01M 50/20

FOREIGN PATENT DOCUMENTS

KR 10-2015-0042076 A 4/2015
KR 10-2016-0128019 A 11/2016

* cited by examiner

*Primary Examiner* — Raymond Alejandro
(74) *Attorney, Agent, or Firm* — Morgan, Lewis & Bockius LLP

(57) ABSTRACT

A cell-tab-cooling type battery may include a plurality of battery cells respectively including tabs for electrical connection from each other, the respective tabs of the plurality of battery cells being aligned in one direction thereof; a plurality of bus bars connected in common to the tabs of the battery cells adjacent to each other among the plurality of battery cells to form an electrical connection between the battery cells; and a plurality of cooling capsules respectively including a coolant and being respectively bonded on the plurality of bus bars.

12 Claims, 4 Drawing Sheets

CELL-TAB-COOLING TYPE BATTERY

CROSS REFERENCE TO RELATED APPLICATION

The present application claims priority to Korean Patent Application No. 10-2019-0049330, filed Apr. 26, 2019, the entire contents of which is incorporated herein for all purposes by this reference.

BACKGROUND OF THE INVENTION

Field of the Invention

The present invention relates to a cell-tab-cooling type battery. More particularly, the present invention relates to a cell-tab-cooling type battery without requiring an additional device configured for supplying or circulating air or cooling water for cooling the battery.

Description of Related Art

As global warming and environmental pollution become serious issues, in the vehicle industry, research and development of environmentally friendly vehicles that can reduce environmental pollution as much as possible are being actively conducted, and the market thereof is gradually expanding.

As environmentally friendly vehicles, electric vehicles, hybrid vehicles, and plug-in hybrid vehicles, which use an electric motor using electrical energy for generating driving power rather than using a conventional engine generating driving power by burning fossil fuels, are being introduced worldwide. Among environmentally friendly vehicles using electrical energy, electric vehicles and hybrid vehicles charge a battery included in the vehicle by receiving electric power from external charging equipment which is connected to a grid, and generates kinetic energy required for driving by use of charged electric power of the battery.

Batteries used in the above environmentally friendly vehicles may output a high level of electric power and thus cause considerable heat. To improve battery performance and life, efficiently exhausting heat generated in the battery and thus preventing the battery from being over heated are very important.

Conventionally, as a cooling system for exhausting heat of the battery, a direct air cooling system where cooling air is directly provided between a plurality of cells forming the battery and an indirect water cooling system where a cooling channel through which cooling water flows is provided in one side of the battery, and a cooling plate contacting to the cooling channel is provided between the plurality of cells, etc. are known.

The conventional direct air cooling system requires a space through which cooling air passes between the plurality of battery cells forming the battery, that is, an air gap, and requires a path through which cooling air flows, and a cooling fan, etc. Furthermore, the conventional indirect water cooling system also requires a cooling plate having a predetermined thickness between the battery cells, a channel and pump for circulating cooling water, etc. As described above, in a conventional battery cooling system, an air gap or a cooling plated is required between battery cells, and thus a certain distance is required between the battery cell. Accordingly, the battery increases in volume which causes the volume-energy density of the battery which represents the volume-to-output to be reduced. Furthermore, a device consuming energy for cooling has to be added, and thus cost of the battery increases and fuel efficiency decreases due to energy consumption.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a cell-tab-cooling type battery, wherein a cooling path or cooling plate mounted between battery cells forming a battery are removed while the volume-energy density is improved but an additional device configured for supplying or circulating air or cooling water for cooling the battery is not required.

In various aspects of the present invention, there is provided a cell-tab-cooling type battery, the battery including: a plurality of battery cells respectively including tabs for electrical connection to each other, the respective tabs of the plurality of battery cells being aligned in one direction thereof; a plurality of bus bars connected in common to the tabs of the battery cells adjacent to each other among the plurality of battery cells to form an electrical connection between the battery cells; and a plurality of cooling capsules respectively including a coolant and being respectively bonded on the plurality of bus bars.

In an exemplary embodiment of the present invention, each of the cooling capsules may include a shell forming an internal space in the shell, and the coolant contained in a portion of the internal space.

In an exemplary embodiment of the present invention, the coolant may receive heat generated in the plurality of battery cells through the tabs and the plurality of bus bars, and undergo a phase change due to the transferred heat.

In an exemplary embodiment of the present invention, the coolant may be a liquid dielectric material which undergoes a phase change from liquid to gas by receiving heat generated in the plurality of battery cells through the tabs and the plurality of bus bars.

In an exemplary embodiment of the present invention, the liquid dielectric material may be liquid fluorine.

In an exemplary embodiment of the present invention, the battery may further include: a bus bar housing including opening portions at areas in association with each of the plurality of bus bars, wherein the plurality of bus bars are fixed by being respectively inserted into the opening portions of the bus bar housing, or by being respectively bonded on a lower surface of the bus bar housing at which the opening portions are formed.

In an exemplary embodiment of the present invention, the bus bar housing may be made of a plastic material.

In various aspects of the present invention, there is provided a cell-tab-cooling type battery, the battery including: a plurality of battery cells respectively including tabs for electrical connection from each other, the respective tabs of the plurality of battery cells being aligned in one direction thereof; a plurality of bus bar assemblies respectively including a plurality of bus bars connected in common to the tabs of the battery cells adjacent to each other among the plurality of battery cells to form an electrical connection between the battery cells, and a bus bar housing having a flat plate shape and including: opening portions at areas in association with each of the plurality of bus bars, wherein the plurality of bus bars are fixed by being respectively inserted into the opening portions of the bus bar housing, or including a lower surface on which the bus bars are attached where the opening portions are formed; and a plurality of cooling capsules respectively including a coolant and respectively bonded on the plurality of bus bars, wherein the plurality of bus bar assemblies is mounted side by side in a direction where the battery cells are aligned.

In an exemplary embodiment of the present invention, each of the cooling capsules may include a shell forming an internal space in the shell, and the coolant contained in a portion of the internal space.

In an exemplary embodiment of the present invention, the coolant may receive heat generated in the plurality of battery cells through the tabs and the plurality of bus bars, and undergo a phase change due to the transferred heat.

In an exemplary embodiment of the present invention, the coolant may be a liquid dielectric material which undergoes a phase change from liquid to gas by receiving heat generated in the plurality of battery cells through the tabs and the plurality of bus bars.

In an exemplary embodiment of the present invention, the liquid dielectric material may be liquid fluorine.

According to the cell-tab-cooling type battery, heat is transferred through the bus bars attached on the tabs of the respective battery cells and through heat transfer paths of the respective cooling capsules connected to the bus bars, and thus cooling efficiency may be improved by the short heat transfer path.

According to the cell-tab-cooling type battery, without using an additional device configured for supplying or circulating air or cooling water for cooling the battery, a battery cooling structure can become simple by removing heat through a phase change by a phase change material of the cooling capsule attached on the battery cell, and thus an increase in a unit price due to adding the cooling device may be prevented.

Furthermore, according to the cell-tab-cooling type battery, cooling performance may be significantly improved since the heat of the tab generating considerable heat in the battery cell is transferred directly to the outside of the battery cell.

Accordingly, according to the cell-tab-cooling type battery, the volume-energy density of the battery may be significantly improved since the volume of the battery itself is reduced by removing an air gap or a cooling plate between the battery cells where a plurality of battery cells form the conventional battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
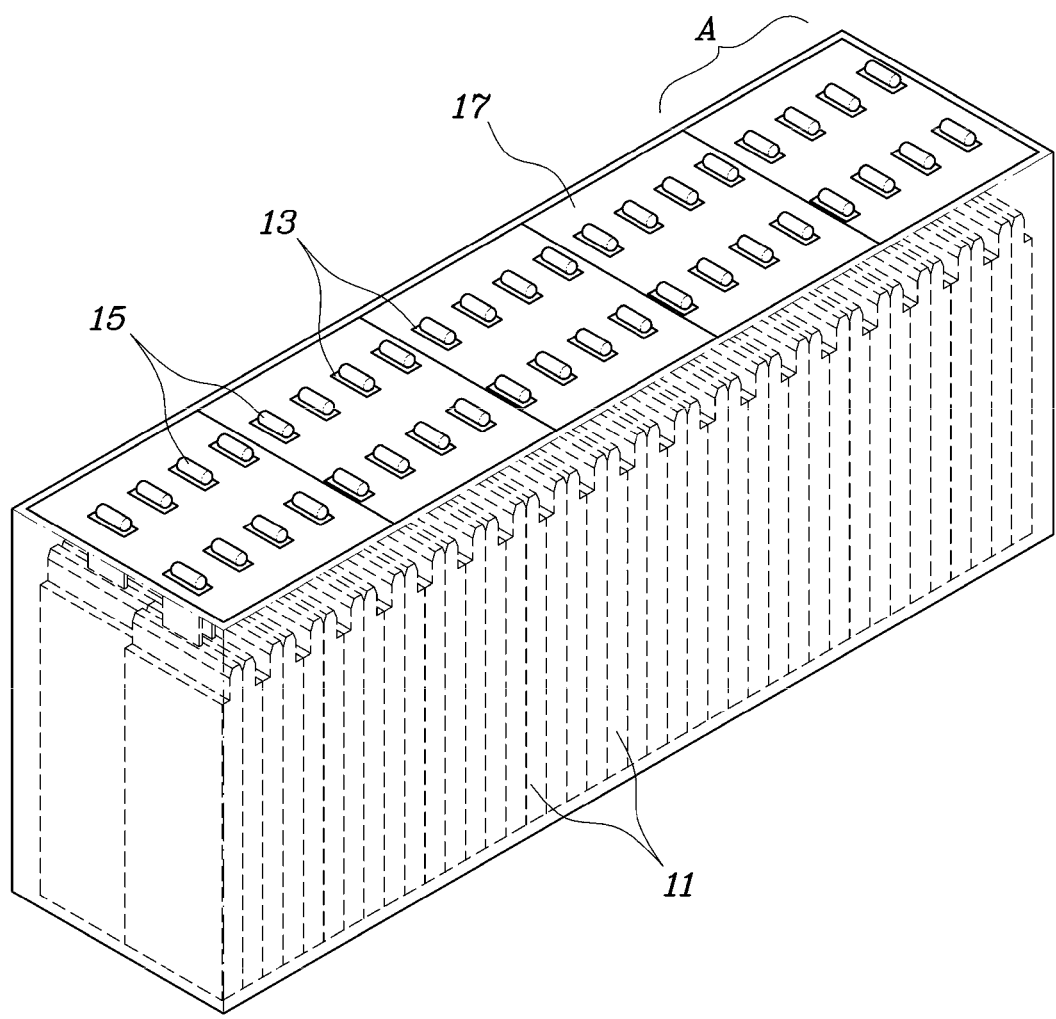
FIG. 1 is a perspective view of a cell-tab-cooling type battery according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. Throughout the drawings, the same reference numerals will refer to the same or like parts.

Hereinbelow, a cell-tab-cooling type battery according to Various embodiments of the present invention will be described in detail with reference to the accompanied drawings.

Figure 2:
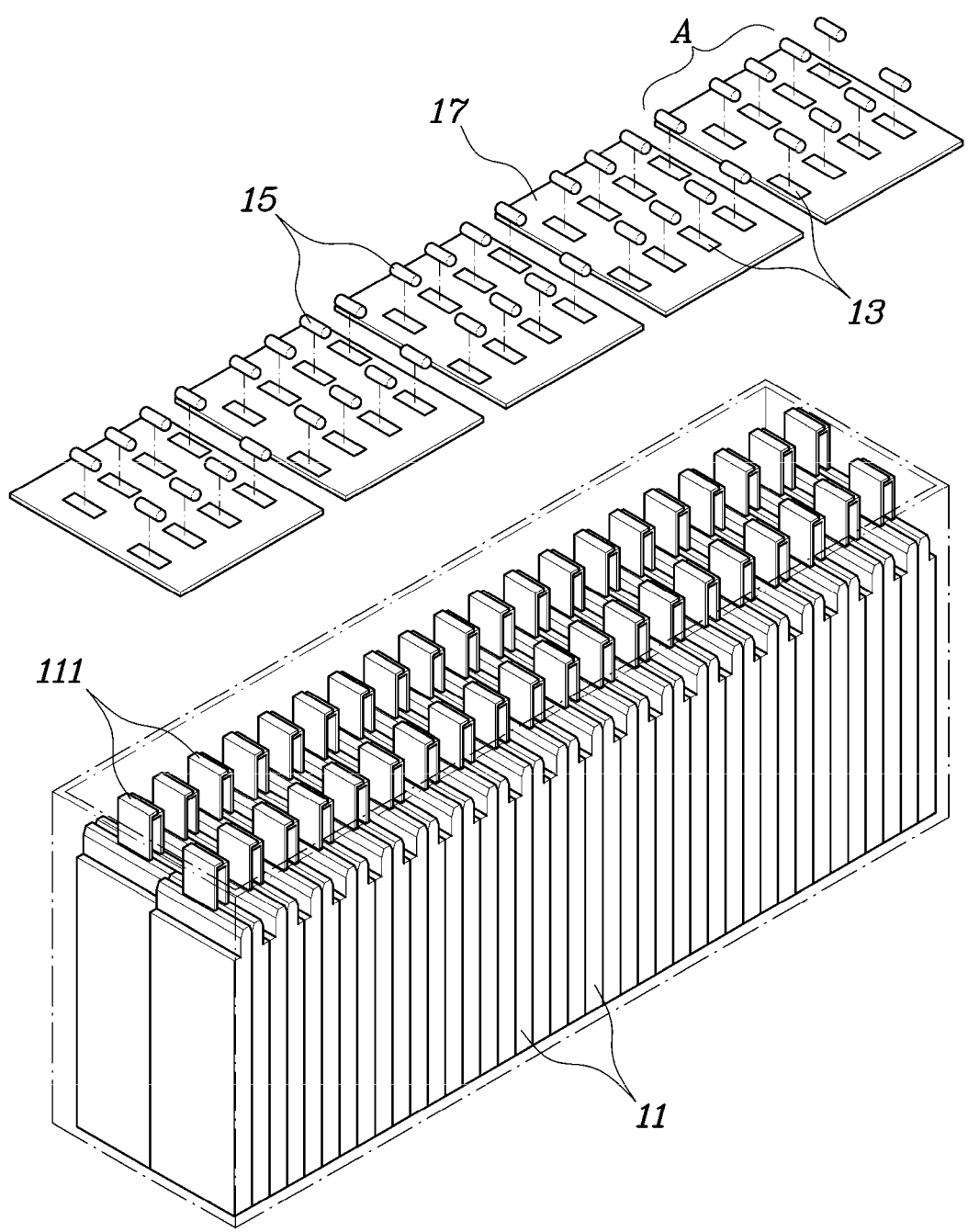
FIG. 2 is a deployed perspective view of a cell-tab-cooling type battery according to an exemplary embodiment of the present invention.
Figure 3:
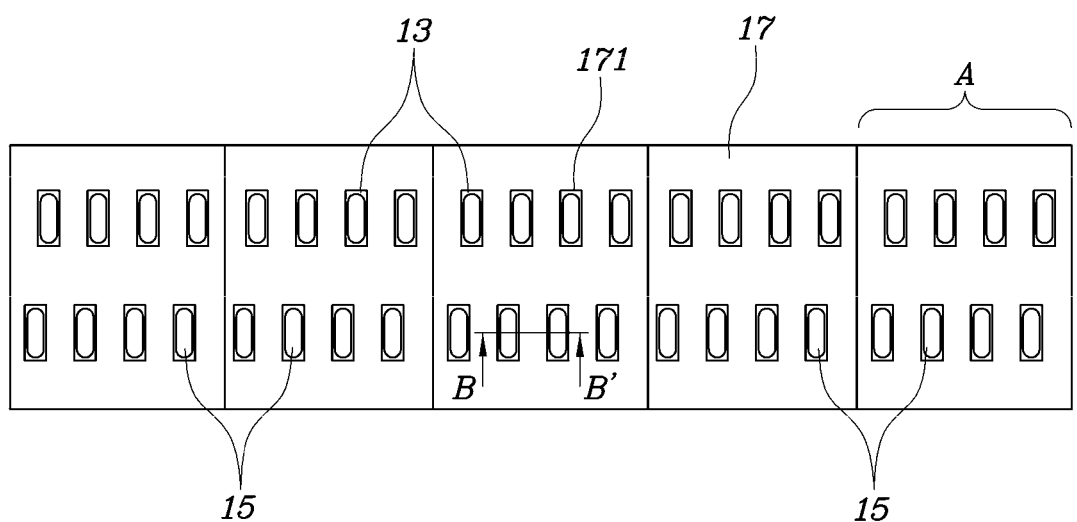
FIG. 3 is a planar view of a cell-tab-cooling type battery according to an exemplary embodiment of the present invention.
Figure 4:
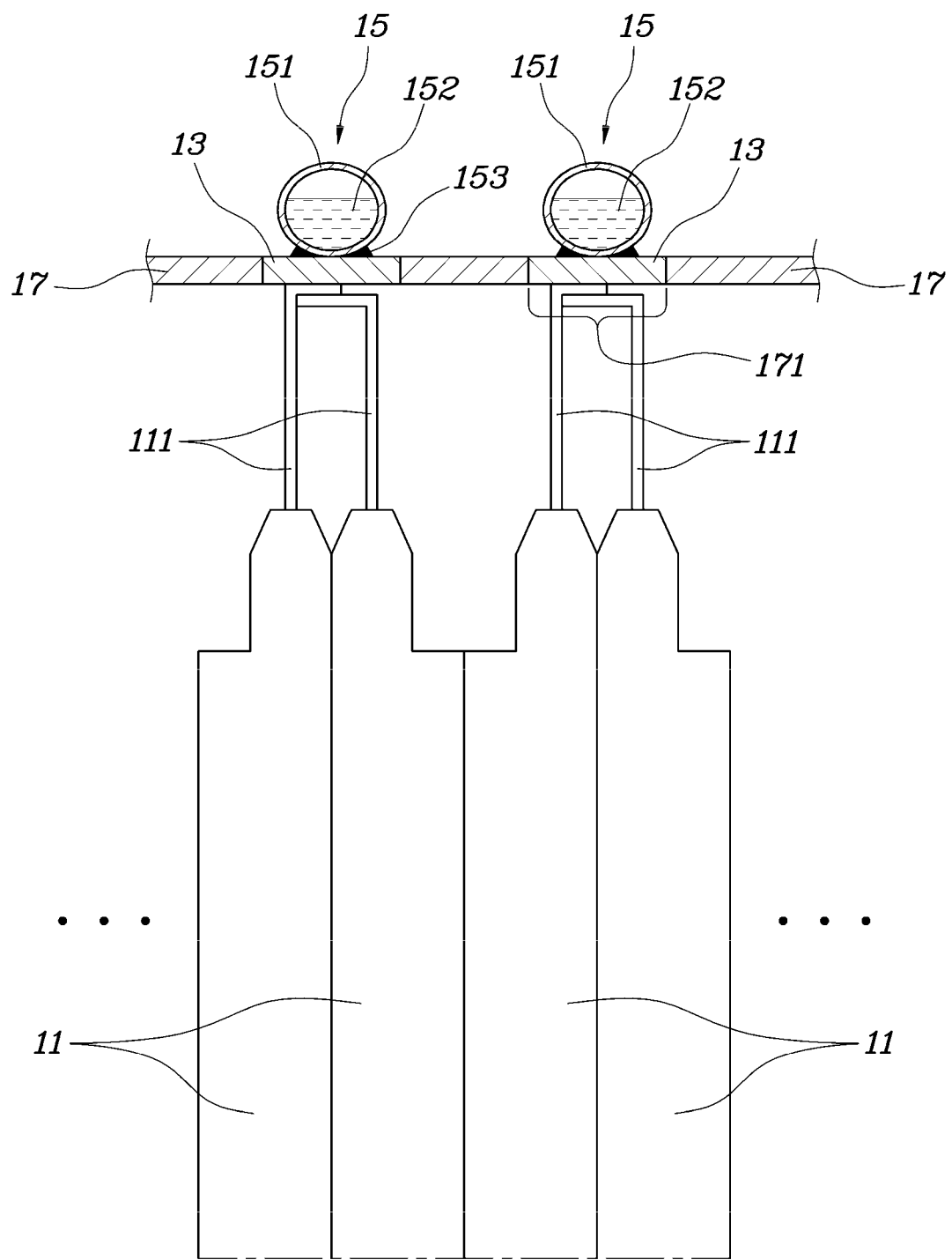
FIG. 4 is a partial cross-sectional view taken along the line B-B' of the cell-tab-cooling type battery according to an exemplary embodiment of the present invention shown in FIG. 3.

FIG. 1 is a perspective view of a cell-tab-cooling type battery according to an exemplary embodiment of the present invention, and FIG. 2 is a deployed perspective view of a cell-tab-cooling type battery according to an exemplary embodiment of the present invention. Furthermore, FIG. 3 is a planar view of a cell-tab-cooling type battery according to an exemplary embodiment of the present invention, and FIG. 4 is a partial cross-sectional view taken along the line B-B' of the cell-tab-cooling type battery according to an exemplary embodiment of the present invention shown in FIG. 3.

Referring to FIG. 1, FIG. 2, FIG. 3, and FIG. 4, a cell-tab-cooling type battery according to an exemplary embodiment of the present invention may include a plurality of battery cells 11, a plurality of bus bars 13, and a plurality of cooling capsules 15.

Each of the battery cells 11 is an element storing a certain amount unit of electrical energy. The plurality of cells 11 are electrically connected to each other, and the above electric connection may be selectively formed in a series or parallel connected structure as needed. A voltage and a capacity of the battery may be determined by a number of battery cells 11 and inter-connection relation between the battery cells 11.

Each of the battery cells 11 may include a tab 111 configured as an electrode through which electrical energy stored within the battery cell 11 is output in a current form when the battery is being discharged, and through which electrical energy to be stored in the battery cell 11 is input in a current form when the battery is being charged. The plurality of cells 11 may be electrically connected from each other by connecting tabs 111 thereof. The plurality of cells 11 are mounted in a form where the respective tabs 111 are aligned in one direction to be easily electrically connected between tabs 111 of the battery cells 11.

In FIG. 1, FIG. 2, FIG. 3, and FIG. 4, an example is shown where each tab 111 becoming a positive (+) electrode and a tab 111 becoming a negative (−) electrode are formed at a first side of the battery cell having a rectangle shape, but the present invention is not limited to the above structure. For example, in a case of a battery cell having a structure where tabs 111 of different polarities are formed in opposite sides of the battery cell having a rectangle shape, each bus bar 13 and each cooling capsule 15 which will be described later may be respectively mounted in both sides where the tabs 111 of the battery cell are formed.

Each of the bus bars 13 is an element for forming an electric connection between the battery cells 11. The bus bars 13 may connect at least two tabs 111 of the battery cells 11 to form an electric connection between the battery cells 11. For example, the bus bars 13 may be employed by use of a conductive metal plate such as copper (Cu) or aluminum (Al), or may be welded to the tab 111, which is made of a similar material, of the battery cell 11 by a welding method, etc.

Each of the cooling capsules 15 may include a shell 151 for forming an internal space and a coolant 152 filled in the internal space formed by the shell 151. The cooling capsules 15 may be fixed by being welded to the respective bus bars 13 by use of a welding method, etc.

The shell 151 of the cooling capsule 15 may be made of a metal or an alloy thereof having an excellent thermal conductivity such as copper (Cu) or aluminum (Al), and may be bonded to the bus bar 13 by use of a brazing method. Accordingly, a welding portion 153 may be formed when the cooling capsule 15 is welded to the bus bar 13.

The coolant 152 contained within the shell 151 may be a liquid non-conductive material (liquid dielectric material). The coolant 152 is a material configured for phase change from liquid to gas by heat transferred through the tab 111 of the battery cell 11 as the battery cell 11 is heated. For example, liquid fluorine may be used for the same. The coolant 152 may cool the battery cell 11 by absorbing heat of the battery cell 11 while undergoing a phase change into gas due to absorbing the heat transferred through the tab 111 of the battery cell 11.

Meanwhile, the cell-tab-cooling type battery according to an exemplary embodiment of the present invention may further include a bus bar housing 17 having a flat plate shape on which the bus bars 13 are attached such that the bus bars 13 are aligned at a desired position.

The bus bar housing 17 may include opening portions 171 respectively passing through upper and lower surfaces of areas at which the bus bars 13 are aligned, and the bus bars 13 may be fixed by being respectively inserted into the opening portions 171 formed in the bus bar housing 17.

Although it is not shown, according to various exemplary embodiments of the present invention, the bus bar housing 17 may have a structure including opening portions 171 respectively passing through the upper and lower surfaces of the bus bar housing 17 at which the bus bars 13 are attached, and the bus bars 13 attached on a lower portion of the bus bar housing 17 may upwardly protrude the bus bar housing 17 through the respective opening portions 171. In the above embodiment, the cooling capsules 15 may be attached on upper portions of the respective bus bars 13 protruding upwardly through the opening portions 171.

Accounting for that the bus bar housing 17 is directly connected to the bus bars 13 having conductivity, it is preferable to employ as the bus bar housing 17 a plastic material having no conductivity.

To attach the bus bars 13 on the bus bar housing 17, seam welding or brazing, which is a process of bonding metal materials and plastic materials together, may be applied.

Meanwhile, in an exemplary embodiment of the present invention, the bus bars 13 and the bus bar housing 17 may be employed in an assembly of a module structure. In other words, the bus bars 13 and the bus bar housing 17 may form a bus bar assembly A such that the assembly A is positioned at an upper portion of partial battery cells mounted consecutively adjacent to each other. A required number of the above bus bar assemblies A may be applied side by side to an upper portion of the battery cells 11, and welding the tabs 111 and the bus bars 13, respectively, may be available by providing welding energy to the upper portion of the respective bus bars 13 that are fixed in the opening portions 171 or upwardly protruding through the opening portions 171. Subsequently, the cooling capsules 15 are mounted on the upper portions of the respective bus bars 13 and the cooling capsules 15 are welded on the respective bus bars 13 by providing welding energy.

Due to the above structural feature, heat generated in battery cells 11 may be transferred to the respective bus bars 13 through the tabs 111 of respective battery cells 11, whereby the heat transferred to the bus bars 13 are transferred again to the respective cooling capsules 15 to be provided to the coolants 152 inside of the respective cooling capsules 15. Considerable heat is absorbed by the coolants 152 by causing the coolants 152 to undergo phase change from liquid into gas, and thus the heat generated in the battery cells 11 is rapidly removed and the battery cells 11 may be cooled.

Various aspects of the present invention are directed to providing a short heat transfer path, and thus cooling efficiency may be improved since the heat is transferred through the bus bar 13 that are directly attached on the tabs 111 of the respective battery cells 11 and through heat transfer paths of the respective cooling capsules 15. Furthermore, an exemplary embodiment of the present invention can provide significantly improved cooling performance since the heat of the tabs 111 generating heat in the respective battery cells 11 is transferred directly to the outside of the respective battery cells 11. Accordingly, an exemplary embodiment of the present invention can significantly improve the volume-energy density of the battery since the volume of the battery itself is reduced by removing an air gap or a cooling plate between the battery cells where a plurality of battery cells form the conventional battery.

In an exemplary embodiment of the present invention, distal ends of the tabs 111 are in an "L" shape and adjacent tabs 111 are overlapped to each other.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A battery comprising:
    a plurality of battery cells respectively including tabs for electrical connection to each other, respective tabs of the plurality of battery cells being aligned in one direction of the plurality of battery cells;
    a plurality of bus bars connected in common to tabs of battery cells adjacent to each other among the plurality of battery cells to form an electrical connection between the adjacent battery cells;
    a plurality of cooling capsules respectively including a coolant and being respectively bonded on upper portions of the plurality of bus bars, wherein each of the plurality of cooling capsules includes a shell forming an internal space in the shell, and the coolant contained in a portion of the internal space; and
    a bus bar housing including opening portions at areas in association with each of the plurality of bus bars, wherein the plurality of bus bars is fixed by being respectively inserted into the opening portions of the bus bar housing, or by being respectively bonded on a lower surface of the bus bar housing at which the opening portions are formed.

2. The battery of claim 1, wherein the coolant receives heat generated in the plurality of battery cells through the tabs and the plurality of bus bars, and undergoes a phase change due to the transferred heat.

3. The battery of claim 1, wherein the coolant is a liquid dielectric material which undergoes a phase change from liquid to gas by receiving heat generated in the plurality of battery cells through the tabs and the plurality of bus bars.

4. The battery of claim 3, wherein the liquid dielectric material is liquid fluorine.

5. The battery of claim 1, wherein the bus bar housing is made of a plastic material.

6. The battery of claim 1, wherein distal ends of the tabs are in an "L" shape and distal ends of adjacent tabs among the tabs are overlapped to each other.

7. A battery including:
    a plurality of battery cells respectively including tabs for electrical connection from each other, respective tabs of the plurality of battery cells being aligned in one direction of the plurality of battery cells;
    a plurality of bus bar assemblies respectively including a plurality of bus bars connected in common to tabs of battery cells adjacent to each other among the plurality of battery cells to form an electrical connection between the adjacent battery cells, and a bus bar housing having a flat plate shape and including opening portions at areas in association with each of the plurality of bus bars, wherein the plurality of bus bars are fixed by being respectively inserted into the opening portions of the bus bar housing, or including a lower surface on which the plurality of bus bars is attached where the opening portions are formed; and
    a plurality of cooling capsules respectively including a coolant and respectively bonded on the plurality of bus bars,
    wherein the plurality of bus bar assemblies is mounted side by side in a direction where the plurality of battery cells is aligned.

8. The battery of claim 7, wherein each of the plurality of cooling capsules includes a shell forming an internal space in the shell, and the coolant contained in a portion of the internal space.

9. The battery of claim 8, wherein the coolant receives heat generated in the plurality of battery cells through the tabs and the plurality of bus bars, and undergoes a phase change due to the transferred heat.

10. The battery of claim 8, wherein the coolant is a liquid dielectric material which undergoes a phase change from liquid to gas by receiving heat generated in the plurality of battery cells through the tabs and the plurality of bus bars.

11. The battery of claim 10, wherein the liquid dielectric material is liquid fluorine.

12. The battery of claim 7, wherein distal ends of the tabs are in an "L" shape and distal ends of adjacent tabs among the tabs are overlapped to each other.

* * * * *